United States Patent [19]
Horst et al.

[11] 3,832,064
[45] Aug. 27, 1974

[54] PATTERN LENGTH MEASUREMENT AND CONTROL BY CONTINUOUS-STATISTICAL-CORRELATION

[75] Inventors: Robert L. Horst, Lancaster; Dennis L. Wolgemuth, Mount Joy, both of Pa.

[73] Assignee: Armstrong Cork Company, Lancaster, Pa.

[22] Filed: Dec. 29, 1972

[21] Appl. No.: 319,777

[52] U.S. Cl.................. 356/163, 356/167, 250/559
[51] Int. Cl............................................. G01b 11/00
[58] Field of Search .......... 356/163, 167, 199, 237; 226/9, 24, 26, 28; 318/85; 235/92 R; 250/559, 560

[56] References Cited
UNITED STATES PATENTS

| | | | |
|---|---|---|---|
| 3,178,510 | 4/1965 | Rosin et al........................ | 356/163 |
| 3,432,672 | 3/1969 | Bessonny et al.................. | 356/199 |
| 3,559,568 | 2/1971 | Stanley............................. | 226/28 |
| 3,594,552 | 7/1971 | Adamson et al.................. | 235/92 R |
| 3,636,254 | 1/1972 | Johnston........................... | 356/167 |

*Primary Examiner*—Ronald L. Wibert
*Assistant Examiner*—Paul K. Godwin

[57] ABSTRACT

An apparatus and a method are provided for measuring repeat length of a repeated design pattern on goods as an inspection technique and quality control system. A pair of photoelectric scanner sensors are positioned apart a distance which is a multiple of the basic pattern repeat length. The output from the scanner sensors is correlated, and a signal is provided which gives an indication of the time shift between the scanned signatures of the repeat pattern which is picked up by the scanner sensors. This value of the time shift is then used with the speed of the goods in on-line calculations to determine the repeat length and/or to control repeat length.

7 Claims, 3 Drawing Figures

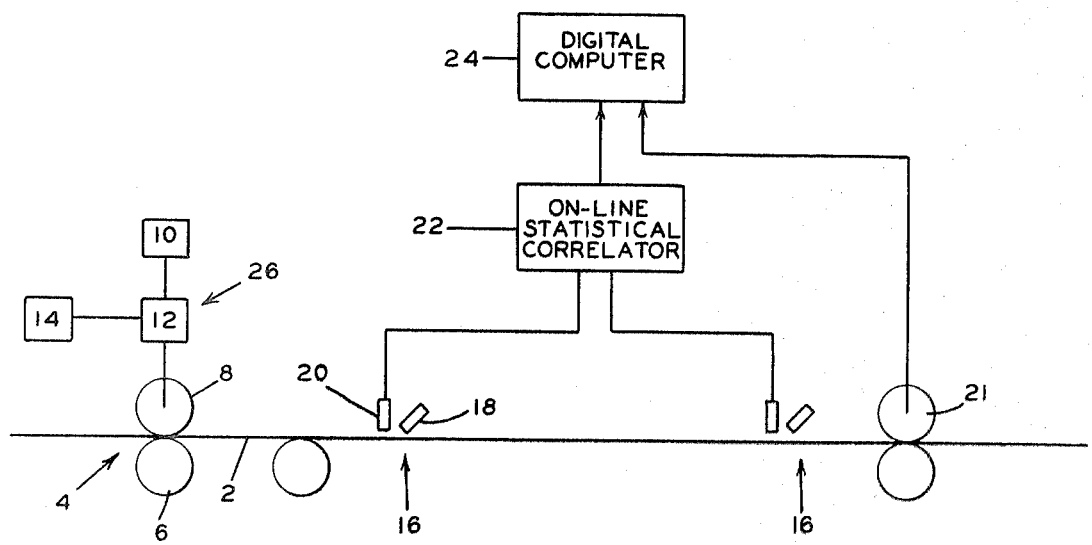
Fig. I
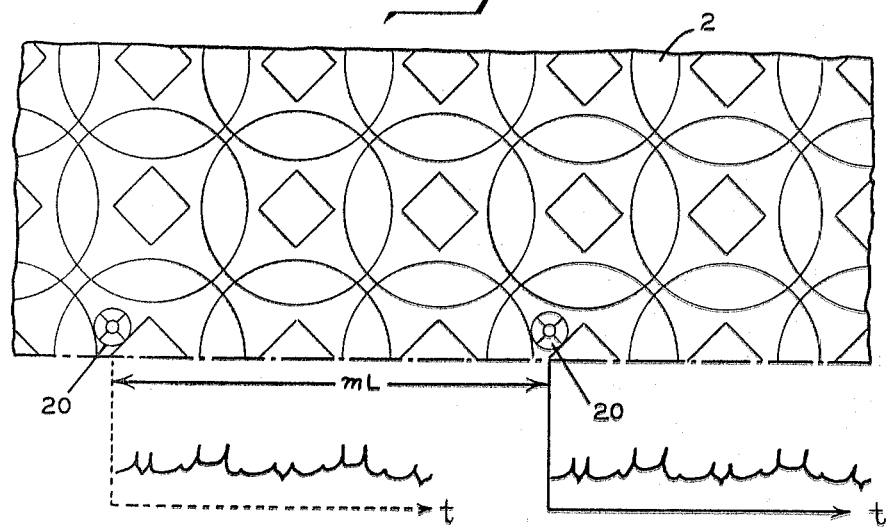
Fig. II
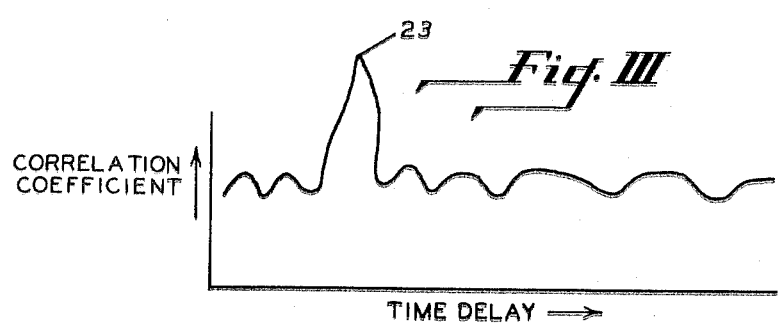
Fig. III

PATTERN LENGTH MEASUREMENT AND CONTROL BY CONTINUOUS-STATISTICAL-CORRELATION

BACKGROUND OF THE INVENTION

1. Field of the Invention

The invention is directed to a repeat length measurement system and, more particularly, to a repeated length measurement system for flooring material which provides information for both an operator and an automatic control system. This data can then be used for visual monitoring and/or recording of the repeat length. In addition, the data is available for a system to automatically control the repeat length on a production line, should the repeat length measurement technique be used appropriately on the line.

2. Description of the Prior Art

The invention relates to pattern length measurement of in-process repeated pattern goods, such as flooring, textiles, wall coverings and the like, and involves an improved method and apparatus for continuous, precise, statistical determination of achieved repeat length. Previous systems depended upon repeating registration marks at intervals along the repeat pattern, which intervals define the pattern limits. The marks provided a means for sampling the achieved length for a single instant of the total pattern interval. Normally, the registration marks were placed apart the distance of a pattern repeat. Appropriate photocell sensors would sense the registration marks and provide an indication as to whether or not the marks were properly positioned relative to the spacing of the photocell sensors. The photocell sensors themselves were normally spaced apart the correct pattern repeat. Based upon timing information picked up by the photocell sensors for a known web velocity, appropriate mechanism was operated to indicate the achieved pattern repeat length for inspection and goods classification. Also, if tied in to appropriate controls, repeat length could be controlled.

SUMMARY OF THE INVENTION

In the present invention, apparatus and a technique are provided for securing a continuous representation of the pattern which is repeated in the finished product. The scanning is carried out by fixed phototransistor sensors which scan an area of the moving goods in the machine direction and provide an electronic signature which is representative of the pattern. As the color and reflectivity of the pattern change, the scanner sensors detect the changing spectral response characteristics and convert this into an analog electronic signature which is a tracing of voltage changes directly related to spectral changes. Scanner sensors take readings at two separate time-displaced points along the pattern; both sensors view the same scan track as the web moves in the machine direction. The sensors are spaced apart a known length, and parallel to the movement of the goods. Variations in the repeat length will provide variations in phase (or time shift) of one signature with respect to the other. These signatures are fed to a digital correlator which compares and correlates by statistical means the phase relationship of the signatures and provides a comparison of the signature signals from the scanner sensors. Also, a speed measuring device is mounted near the sensors to give an accurate and continuously updated measurement of line speed. Based upon the information provided simultaneously by the correlator and speed measuring device, calculations are made to determine the repeat length. If continuous repeat length measurement is desired in real-time, these calculations are done repetitively and automatically by digital computational means. Also, the correlator information can be used in conjunction with appropriate drive controls to control repeat length.

BRIEF DESCRIPTION OF THE DRAWING

FIG. I is a representation of the apparatus for carrying out the invention herein;

FIG. II is a top view of a repeat pattern and the representation of the electronic signature of the pattern; and FIG. III is a plotting of the correlation of the above-mentioned electronic signatures.

DESCRIPTION OF THE PREFERRED EMBODIMENT

The apparatus for carrying out the invention herein is best shown in FIG. I. A sheet material 2 with a repeated decorative pattern is to be measured. By repeated pattern, it is meant a pattern which repeats itself a fixed distance along the machine direction.

The invention herein to measure repeat length involves two scanner sensors 16 and pulse generator 21. Each scanner sensor 16 is composed of a light source 18 and a phototransistor 20. The light source provides light to sheet 2, and phototransistor 20 measures the reflectance of the surface being illuminated. The pulse generator is positioned to determine line speed. The photosensors are connected to the statistical correlator, and the correlator output and velocity transducer are connected to a high speed digital computer 24. The computer is programmed to provide a continuous listing of the pattern length and, optionally, a control signal output to a web pattern length adjustment mechanism. Note that the control task is possible only in certain applications; for example, there is no control mechanism on a finished goods inspection line where only measurements are desired.

If embossing or printing is done on the line, the pattern applying apparatus 4 is basically composed of a back-up roll 6 and a pattern roll 8. The roll 4 is provided with a pattern, and the repeat length is normally the circumference of the roll 4. Particularly in the flooring art, it is desirable that repeat patterns be capable of being matched up with each other when the material 2 is laid in a side-by-side relationship. Consequently, the repeat length of the pattern must be accurately controlled. This can be readily seen when one simply reconsiders the fact that on a two-foot repeat pattern, an error of 0.01 inch in the length of the first repeat pattern will be multiplied through 100 feet into ½ inch if it is not corrected. One-half inch would be quite noticeable if a 100-foot long strip of pattern material with a correct repeat is placed beside a 100-foot long strip of material with the repeat error repeated therein. While the patterns may match at the first repeat, by the time that one moves to the end of the 100-foot length, there will be a ½ inch mismatch in the patterns of the two strips.

In order to control the repeat length, a system must be provided to accurately measure the repeat length as it is coming out of the pattern applying structure 4. Should there be an error in the repeat length at this time, it must be corrected before it has a chance to multiply. The roll structure 8 is normally driven by a conventional drive motor 10 through a transmission structure 12. Connected with the transmission structure 12 is a DC correction motor 14 which is manually controlled by a line operator or computer controlled. Such a transmission-DC correction motor structure is commercially available and is sold by Fairchild-Hiller Corporation under the trade name of "Specon." By operating the DC correction motor, the roll structure 8 is caused to speed up or slow down relative to the sheet movement and, therefore, shrink or stretch a repeat pattern to bring it back into the required repeat size. Other ways may be used to secure repeat length control.

The invention herein can provide information to the line operator to advise him that a correction is needed and that he must operate the DC correction motor 14. The inventive structure can also provide information to a computer to let it operate the correction motor 14.

Referring now to FIG. II, there is shown the sheet material 2 with a pattern printed thereon. The phototransistors 20 and light sources 18 of the two sensor scanners 16 are represented by the circle configuration shown on the lower portion of the sheet material. Due to the fact that the sheet material is provided with a pattern, and normally the pattern is colored, but need not necessarily be colored, the reflectance of the surface of the sheet 2 will vary as the pattern varies. The phototransistor 20 picks up this variation in reflectance and provides an electronic signal which is directly related to the difference in reflectance of the pattern surface. As shown in FIG. II, there is provided a pattern signature for each of the phototransistors 20. It will be noted that the pattern signature for both transistors is exactly the same, because the pattern repeat is identical and both are sensing the same pattern along a given scan-track. It will be noticed that the pattern signatures are in phase synchronization, and the correlation between the two is at a maximum at zero delay because there is no time shift between the phase of the two pattern signatures.

The electronic pattern signatures are then fed to a digital correlator 22. One such digital correlator 22 is a Hewlett-Packard Model 3721A Correlator. The sensor scanners 16 provide inputs to the correlator. The designated correlator continually updates and displays 100 values of the cross correlation coefficient simultaneously. Briefly, the correlator operates by continuously storing and updating sampled data from both scanners, solving in real-time the cross-correlation function $$R_{xy}(T) = \lim_{\tau \to \infty} \frac{1}{T} \int_0^T x(t - \tau) \cdot y(t) dt$$

and continuously displaying the solution and communicating that solution to an interconnected digital computer 24. The distance of each point from a base line represents the average correlation coefficient (in units of voltage) for a given time relationship between the two sampled signatures. The number of samples for this averaging to provide a single point is adjustable. Each correlation coefficient is a value for a given time delay ($\tau$) between the pattern signature of one scanner with respect to the pattern signature of another scanner. Thus, if the pattern signature of one scanner is in phase with the pattern signature of another scanner, the maximum correlation is at a time delay of zero ($\tau = 0$) and is so displayed on a CRT (Cathode Ray Tube).

Referring now to FIG. III, there is shown a typical CRT display of the cross-correlation function with time-displaced maximum occurring at point 23. This point is time-shifted to the right from the beginning of the 100 point cross-correlation representation. This thus indicates that at zero time shift there is not maximum correlation between the signature patterns of the two scanner sensors 16. As shown in FIG. III, the repeat pattern being measured is longer or shorter than the distance between scanners, depending on the sense of the correlation; i.e., "A" to "B" or vice versa. An alternative method is to deliberately introduce a time delay electronically so the point of maximum correlation lies at the center of the cathode ray tube for zero time delay. This feature is available as part of the correlator. Then any repeat length less than or greater than the distance between the scanners will give a point of maximum correlation at a given position to the left or right of the center of the scope, for a given pattern (web) speed.

The 100 values of correlation displayed on the cathode ray tube are also available in digital form for external output from the correlator. This information is accepted by the digital computer 24. The computer also accepts data signals from the pulse generator 21 to determine the line speed. The computer determines the point of maximum correlation and then does the following computation to find the repeat length, assuming dot 50 represents zero time shift:

(50 − point of maximum correlation) (time interval between sample) = time delay

Distance between scanners + (time delay) (speed) = repeat length.

The display on the CRT can be used by a line operator to provides a visual indication of repeat length error. He can then adjust DC motor 14 and the CRT will indicate change of error back to normal repeat length. A better system is to use the control output from computer 24 to automatically control motor 14.

What is claimed is:

1. An apparatus for measuring the repeat length of a pattern of many variations of reflectivity, said pattern being placed upon a sheet material, said pattern being repeated on the sheet material at a predetermined repeat length, means placing the repeated pattern on the sheet material, comprising two scanner sensors, each scanner sensor being composed of a light source which shines upon the sheet material surface containing the pattern and a sensing means for continuously measuring spectral response of the light reflected from the reflective variations of the pattern on the sheet material, said sensing means of the two scanner sensors being spaced apart a distance approximately equal to the repeat pattern length, said sensing means generating an electrical signal which varies many times in a repeat length in response to changes of reflected light from the sheet material due to the change of pattern, said electrical signals from the sensing means being fed to a correlator means which compares the electrical signal pattern signatures from the two sensing means, then said correlator means providing by statistical means an indication of the phase relationship of the two electrical signal pattern signatures, which phase relationship is related to the relationship of the two patterns of electrical signals developed by the sensing means.

2. The apparatus of claim 1 wherein the phase relationship information of the correlating means and line speed are fed to a computer means to calculate repeat length.

3. The apparatus of claim 1 wherein the phase relationship information of the correlating means and line speed are fed to a computer means to control the means placing the repeat pattern on the sheet material to secure a uniform repeat length.

4. The apparatus of claim 1 wherein the phase relationship information of the correlating means is presented as a visual display and used for manual control of the means placing the repeat pattern on the sheet material to secure a uniform repeat length.

5. The method of measuring the repeat length of a pattern of many variations of reflectivity, said pattern being placed upon a sheet material, said pattern being repeated on the sheet material at a predetermined repeat length, placing the repeated pattern on the sheet material, comprising the steps of scanning the sheet material at two separate points with scanner sensors which continuously measure the spectral response of the light reflected from the reflective variations of the pattern on the sheet material, said sensing means being positioned apart a distance approximately equal to the pattern repeat length and said sensing means generating an electrical signal which varies many times in a repeat length in response to changes of reflected light from the sheet material due to changes of pattern, feeding the signals from the sensing means to a correlator means, comparing the signal pattern signatures from the sensing means in the correlator means, by statistical means to secure an indication of the phase relationship of the two signal pattern signatures, which phase relationship is related to the relationship of the two patterns of signals developed by the sensing means.

6. The method of claim 5 wherein the indication of the phase relationship of the two signals is used to control the means placing the repeated pattern on the sheet material to secure a uniform repeat length.

7. The method of claim 5 wherein said correlating means carries out the statistical comparison by utilizing multiple sample data points from a single repeat pattern for each comparison.

* * * * *